3,018,760
DUST BATHING APPARATUS
Herbert L. Tate, 444 Blackstone Ave., Fresno, Calif.
Filed May 16, 1960, Ser. No. 29,249
9 Claims. (Cl. 119—159)

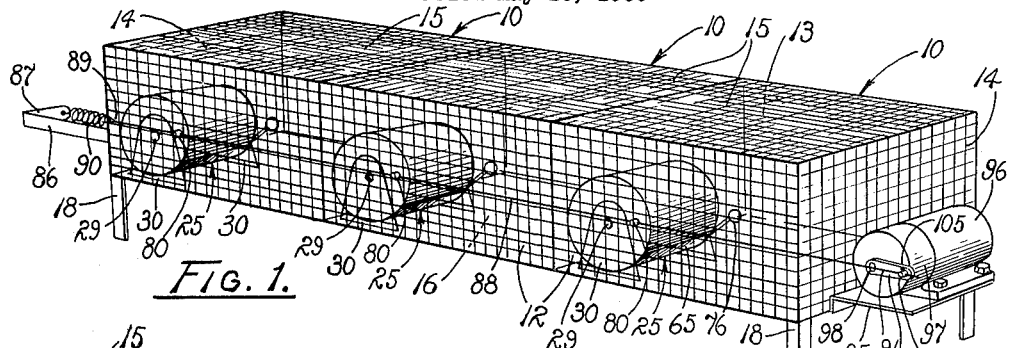
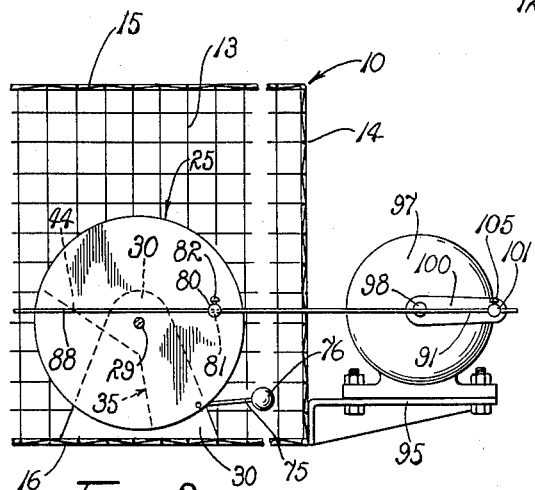
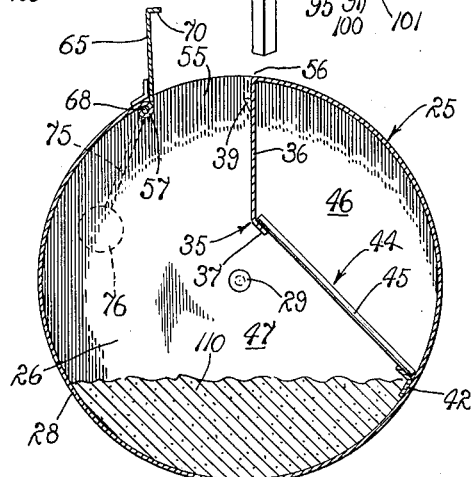
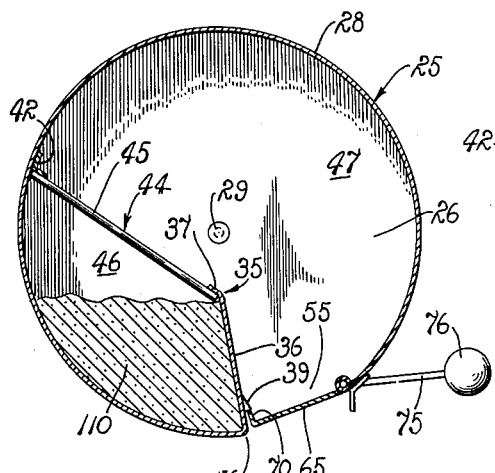
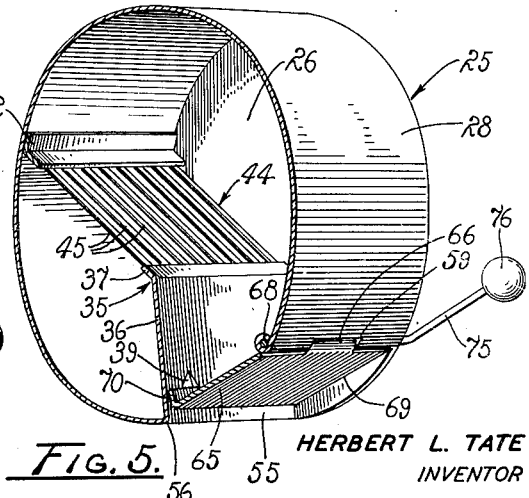
Jan. 30, 1962 — H. L. TATE — 3,018,760
DUST BATHING APPARATUS
Filed May 16, 1960
HERBERT L. TATE
INVENTOR
HUEBNER & WORREL
ATTORNEYS United States Patent Office 3,018,760
Patented Jan. 30, 1962

The present invention relates to dust bathing apparatus and more particularly to an automatic apparatus for enabling fur bearing animals to clean their fur in a safe and sanitary manner and at predetermined intervals in dust or other powdered material.

It is essential in the raising of chinchillas and certain other pelt animals to protect their fur. The best pelts are sold for further processing and eventual incorporation into fur coats, wraps, neck pieces, and the like and only prime pelts can be sold profitably.

In order to preserve the quality of the fur, it must be kept clean. It is known that the most practical cleansing medium is dust. Conventionally, a box or pan of dust is placed in the chinchillas' cages and the animals clean their own fur by rolling in the dust and by rubbing it against their fur and skin. This is referred to herein and in the art as a dust bath.

However, such boxes or pans of dust are frequently upset by the animals and the dust is scattered about the cage until an insufficient amount remains for effective bathing and the entire cages are soiled. Of perhaps greatest significance, however, the dust is often contaminated by animal excreta. Such contaminants in the dust may indelibly stain the chinchilla's fur thereby destroying the value of the prospective pelt or materially reducing its value. As a result, it has been found to be impractical to leave the boxes and pans in the cages with the animals except for brief bathing periods.

Of ever increasing importance is the time and expense involved in caring for chinchillas, particularly large herds of five hundred to one thousand animals. In large polygamous breeding units where the female are confined to their individual cages, an attendant must open each cage and clean or replenish the dust preferably once a day or at such other longer intervals as is economically possible. Even with this time consuming attention, the chinchillas can easily stain and damage their fur. Because of this, a significant part of the labor involved in the care of chinchillas is devoted to the placing of the dust boxes in the chinchillas' cages, removing them from the cages and cleaning the dust after removal. In order to make the production of chinchillas economically feasible, it has become the practice to make the dust baths available much less frequently than is desirable.

Accordingly, it is an object of the present invention to provide an apparatus for enabling certain fur bearing animals to clean their fur in a safe and sanitary manner.

Another object is to provide an automatically operable dust bath for fur bearing animals.

Another object is to provide an automatic dust bath for chinchillas, and other fur bearing animals, which cleans the dust of animal excreta and other contaminants immediately subsequent to baths taken in the dust by the animals.

Another object is to restrict an animal's bathing time in a dust bath to certain intervals of predetermined duration.

Another object is to provide a dust bathing apparatus which prevents the animals from removing any appreciable amount of dust while bathing or playing in the dust.

Another object is to minimize the time, expense and labor involved in the raising of chinchillas, and other animals requiring dust baths.

Another object is to obviate the need for frequent manual attention to cages for chinchillas, and the like, for the purpose of cleaning, changing, or replenishing their dust baths.

Other objects are to provide an animal bathing apparatus which is adaptable to small or large batteries of cages, which is simple and economical to construct and install, and which is dependable in operation.

A further object is to provide such a bathing apparatus which is also advantageously employed by birds for a similar purpose.

These, together with other objects, will become more fully apparent upon reference to the following description and accompanying drawing.

In the drawing:

FIG. 1 is a perspective view of a battery of animal cages equipped with an automatic bathing apparatus embodying the principles of the present invention.

FIG. 2 is a fragmentary, somewhat enlarged, longitudinal section of one of the cages of FIG. 1 and showing part of the subject bathing apparatus mounted in the cage.

FIG. 3 is a still further enlarged transverse section of a bath housing used in the subject apparatus and shown in a bathing position.

FIG. 4 is a view similar to FIG. 3 but with the housing in a non-bathing position, which position is also illustrated in FIGS. 1 and 2.

FIG. 5 is a perspective view of the housing in the same position as shown in FIG. 4 but omitting the bathing dust.

Referring more particularly to the drawing, a battery of animal cages 10, preferably constructed of wire mesh, is illustrated in FIG. 1. For convenience of description, the subject cages are hereinafter described for use in the raising of chinchillas although it is to be understood that the cages and the subject apparatus are useful for raising other animals including birds where problems similar to those described herein are involved. Each cage has front and rear walls 12 and 13, opposite side walls 14, a top wall 15, and a bottom wall 16. Of course, adjacent cages have a common side wall. Legs 18 are connected to the cages and support the bottom walls in upwardly spaced relation to the ground, or other support surface, for reasons which will become evident.

The subject apparatus includes a plurality of elongated, substantially cylindrical, housings 25 individually located in the cages 10. Since each housing is identical, only one is described in detail. Each housing has a pair of spaced parallel front and rear end walls 26 interconnected by an annular side wall 28 concentrically circumscribing an elongated, longitudinal axis of rotation for the housing. Horizontal trunnions 28 are endwardly coaxially extended from the end walls and rotatably support the housing in mounting brackets 30 upwardly extended from the bottom wall 16 of its respective cage 10. The housings are mounted so that all of the front end walls are in a common vertical plane and so that they are rotatable about horizontal axes located in a common horizontal plane.

An angulated partition 35 includes an imperforate panel 36 integrally, inwardly chordally extended from the side wall 28 into the housing 25 and is slightly shorter than the radius of the side wall. The panel has an inner angular flange 37 on one side thereof, and an outer stop 39 is provided on the opposite side from the flange relatively adjacent to the side wall. An angulated bracket 42 is extended longitudinally of the housing 25 and is secured along the inside surface of the side wall 28 in circumferentially spaced relation to the connection of the panel to the side wall. The partition also includes a perforate portion 44 including a plurality of elongated bars 45 interconnecting the flange 37 and the bracket 42 in transversely, substantially equally spaced relation to each other. The bars thus extend chordally inwardly from the side wall and are connected to the panel along a line substantially parallel to the axis of the housing. In the preferred embodiment illustrated, the bars, that is the perforate portion of the partition, are slightly longer than the radius of the side wall 28. The included angle between the perforate portion and the panel is obtuse but less than 180°. The partition divides the housing into a sifting compartment 46 on the included angle side of the partition and a relatively larger bathing compartment 47 on the opposite side of the partition.

The side wall 28 has a rectangular, longitudinally extended animal passageway 55 therein in juxtaposition to the imperforate panel 36 of the partition 35. The passageway is circumscribed by a partition edge 56 defined by the intersection of the side wall and the panel, an inwardly rolled hinging edge 57 in opposed substantially parallel relation to the partition edge, and by the end walls 26. It is also to be noted that the hinging edge has a central notch 59 therein. These passageways are individually larger than the chinchillas confined in the cages 10 to enable their passage into and out of their respective bathing compartments 47. Since each passageway leads into its respective bathing compartment, and a partition 35 separates the two compartments 46 and 47, chinchillas are not able to get into the sifting compartment.

A rectangular door 65, of approximately the same size as the passageway 55, includes a rolled tongue 66 extended through the notch 59 and in axial alignment with the rolled hinging edge 57. A hinge pin 68 is slidably extended through the aligned tongue and edge 57, and the tongue is secured, as by welding, to this pin whereby the door and the pin pivot together relative to the side wall 28. The door has a pair of opposite side edges 69 slidably engageable with their respectively adjacent end walls 26 of the housing 25 and an inwardly angulated abutment flange 70. The door is pivotal between a closed position over the passageway with said abutment flange engaging the stop 39 and said side edges engaging the end walls, and an open position, illustrated in FIG. 3, outwardly spaced from the passageway. Interengagement of the tongue and edge and engagement of the door with the side wall limit the extent of opening of the door in its open position.

A lever 75 is integrally connected to the hinge pin 68 and outwardly extended on the opposite side of the pin from the door in obtuse angular relation therewith, as is illustrated in FIG. 4. A weighted ball 76 is secured to the lever in outwardly spaced relation to the pin. The lever is endwardly outwardly spaced from the adjacent end wall 26 of the housing 25 by a distance greater than the radius of the ball so as to enable movement of the ball in endwardly spaced relation to said end wall. It is also to be noted that the total mass on the ball side of the pin is greater than the total mass on the door side of the pin. Studs 80 are endwardly extended from the front end walls 26 of the housings in uniformly circumferentially spaced relation to the hinge pins 68 on the opposite sides of their respective passageways 55 from said pins, as is illustrated in FIGS. 1 and 2. Each stud preferably has an aperture 81 extended therethrough, and a setscrew 82 is screw-threaded into each stud transversely of its respective aperture.

An L-shaped bracket 86 is endwardly extended from one of the side walls 14 of an endmost cage 10 and provides a leg 87 slightly above the common plane of the axes of the housings 25. An elongated flexible cable, wire, or other tension member 88 has an end 89 connected to the leg of the bracket by a tension spring 90 and an opposite end 91. The cable is extended longitudinally through the battery of cages between the front cage walls 12 and the end walls 26 of the housing and, more particularly, through the apertures 81 of all of the studs 80. The cable is in taut condition between adjacent studs, and the respective setscrews 82 are tightened for securing the cable to the studs. The tension spring yieldably urges the studs into bathing positions on the same sides of their respective housing axes as the spring and in a common horizontal plane spaced slightly above the common plane of the axes of the housings. The spring is resiliently yieldable, that is extensible, to permit the studs to be moved into non-bathing positions on the opposite sides of their respective housing axes from the spring incident to pulling on the cable in a direction away from the spring, as shown in FIGS. 1 and 2.

A platform 95 is extended outwardly from the side wall 14 of the endmost cage 10 opposite to the cage mounting the bracket 86. An electrical motor 96 is borne by the platform and is connected to a gear box 97 having an output shaft 98 extended forwardly beyond the common plane of the front end walls 26 of the housings 25 and in the same plane as the studs 80 in either of their bathing or non-bathing positions, as described above. An arm 100 is radially outwardly extended from the output shaft, and a boss 101, similar to the studs 80, is extended outwardly from the arm. The boss has an aperture slidably receiving the end 91 of the cable 88, and a setscrew 105 is screw-threadably extended through the boss into engagement with the cable. The output shaft is adapted for unidirectional rotation in a clockwise direction, as viewed in FIG. 2, thereby to move the arm between a position extended away from the cages, as illustrated in FIG. 2, wherein the studs are in non-bathing positions and a position extended toward the cages wherein the studs are in bathing positions.

*Operation*

The operation of the described embodiment of the subject invention is believed to be apparent and is briefly summarized at this point. Each of the housings 25 is provided with a quantity of a finely divided, solid, animal bathing dust, generally indicated by the numeral 110 in the drawing. This dust is of a type well-known in the art for this purpose and is usually simply finely divided soil. The motor 96, is energized, if necessary, to rotate the arm 100 into the position illustrated in FIG. 2 wherein it extends away from the cages 10. This rotates the housings 25 into their non-bathing positions with the passageways 55 disposed downwardly with respect to the housings, with the partitions 35 downwardly declined toward their respective passageways, and with all of the dust collected within the sifting compartments 46. Also, the balls 76 gravitationally urge the doors 65 into closed positions with their respective abutments flanges 70 engaging the stops 39. With chinchillas individually placed in the cages 10, for example, it is to be noted that they are not able to enter the housings 25 through the passageways 55 because the doors are closed. Furthermore, the taut cable 88 interconnecting the boss 101 and the respective studs 80 on the housings precludes rotation of the housings out of said non-bathing positions. The gear mechanism, not shown, in the gear box 87 possesses enough frictional resistance to movement that rotation of the housings out of non-bathing positions, at least within the limits of the abilities of the contained chinchillas, is precluded.

It is preferred to have the chinchillas take their baths at predetermined intervals and for the bathing periods to be of relatively short durations. Accordingly, the motor 96 is energized, preferably by self-operated, automatic time-controlled means, not shown, at such predetermined intervals. Movement of the arm 100 in a clockwise direction from the position shown in FIG. 2, allows the tension spring 90 to rotate the housings 25 in counterclockwise directions, as viewed in FIG. 2, thereby to move the housings into bathing positions, as viewed in FIG. 3, when the arm is displaced approximately 180° from the position illustrated in FIG. 2. In the bathing positions of the housings, the passageways 55 are disposed upwardly with respect to the housings, the partitions 35 are downwardly declined or extended from their respective passageways into the housings, the dust is collected in the bottoms of the bathing compartments 47, and the balls 76 have flipped the doors 65 into open positions extended upwardly from the housings. It is to be observed at this point that the engagement of the doors and the side walls precludes further counterclockwise movement of the doors and weighted balls beyond the positions illustrated in FIG. 3.

Opening of the doors 65 thus allows the chinchillas to enter their respective bathing compartments 47 where they are able to bathe in the dust 100. Of course, as the housings 25 rotate from non-bathing to bathing positions, the doors begin to open and allow chinchillas to gain access to the bathing compartments even before the housings reach said bathing positions.

The motor 96 continues to rotate so that the arm 100 continues toward its original position after reaching said position of 180° displacement. The cable 88 is thus pulled away from the tension spring 90 to return the housings toward non-bathing positions. As the housings rotate in clockwise directions, as viewed in FIG. 3, it will be evident that the dust 110 flows between the bars 45 into the sifting compartments 46. However, the spaces between the bars are sufficiently narrow to preclude passage of animal droppings and other foreign particles from the bathing compartments into the sifting compartments. In this manner, the bathing dust is continuously maintained in clean, filtered condition. As the housings approach non-bathing positions, the bars 45 are moved into downwardly declined positions, as viewed in FIG. 4, so that said foreign particles gravitationally slide downwardly along the bars and the panels 36 through the passageways 55 prior to their being closed by the doors 65. In order to facilitate discharge of such foreign particles, the perforate portion 44 is made of said bars extended longitudinally chordally of the side wall 28. These particles drop downwardly through the mesh of the bottom walls 16 onto the ground underneath the cages 10 so that the cages are continuously maintained in clean condition.

When the levers 75 are just past an upwardly extended vertical position with the balls 76 positioned above the hinging edges 57, the balls 76 thereafter fall downwardly gravitationally to move each door 65 into closed position. If a chinchilla remains in its housing 25 after the latter has moved into non-bathing position, it cannot attain access to the dust 110 or contaminate the same with droppings because of the protection afforded by the bars 45. However, if such a contained chinchilla jumps onto the door, the weight of the chinchilla and the door are greater than the weight of the ball 76 so that the door immediately opens and the chinchilla falls downwardly on the bottom wall 16 of its respective cage 10. The speed of the motor is regulated so as to permit the desired bathing period. Normally ten to twenty seconds during each cycle of operation is adequate.

It is significant to note that in rotation of the housings 25 between bathing and non-bathing positions, the perforate portions 35 oscillate through an intermediate vertical position downwardly extended from their respective panels 36 and between positions spaced slightly less than 180° apart. It is this oscillation of the housings which permits the dust 110 to flow back and forth between the compartments 46 and 47 and thereby to remain in the housings and not to discharge through the passageways. Thus substantially all of the dust is retained in the housings and not scattered out of the housings as with prior art devices.

When the arm 100 reaches its original position outwardly extended away from the cages 10, the motor 96 is de-energized thereby to hold all of the housings in non-bathing positions. Preferably, de-energization of the motor is effected automatically. This cycle is repeated periodically according to the needs of the chinchillas and the desires of the chinchilla rancher.

From the foregoing, it will be evident that a highly efficient automatic animal bathing apparatus has been provided. Use of the subject apparatus enables the production of more high quality pelts from fur bearing animals since the animals can periodically clean their fur in a safe and relatively sanitary manner. Since the apparatus is automatic and requires little or no manual attention, it results in considerable saving in time, expense, and labor in the raising of chinchillas and other fur bearing animals.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for enabling a fur bearing animal to clean its fur at predetermined intervals comprising a cylindrical housing adapted to contain an animal bathing dust and having a passageway therein large enough for such an animal to enter or leave the housing, means supporting the housing for movement between bathing and non-bathing positions with the passageway located respectively upwardly and downwardly relative to the housing, a door, means connecting the door to the housing for movement between a closed position over the passageway in said non-bathing position and an open position extended away from the housing and from the passageway in said bathing position, and means mounted within the housing for filtering the dust and retaining the same in the housing during movement into non-bathing position and making the dust available for bathing purposes during movement into bathing position.

2. In an animal bathing apparatus, a housing adapted to contain a flowable bathing material and having a cylindrical side wall circumscribing an axis of rotation for the housing; a partition extended within the housing having interconnected perforate and imperforate portions respectively connected to the side wall in spaced relation circumferentially thereof and dividing the housing into sifting and bathing compartments, the imperforate portion projecting substantially radially inwardly from said side wall, the side wall having an animal passageway therein in juxtaposition to the imperforate portion of the partition and leading into the bathing compartment; and means rotatably supporting the housing in a substantially axially horizontal attitude for movement of said perforate portion in opposite directions through an intermediate upright position downwardly extended from the imperforate portion between oppositely downwardly declined bathing and discharging positions with said passageway being respectively above and below said perforate portion in said positions, whereby such bathing material is adapted to flow back and forth through said perforate portion between said compartments during said movement thereby to sift animal droppings and other foreign particles from such material each time the material enters the sifting compartment from the bathing compartment, and whereby such particles slide down the perforate portion and out through the passageway as the perforate portion moves toward said discharging position.

3. In an animal bathing apparatus, an elongated, substantially cylindrical housing adapted to contain a flowable bathing dust and having a side wall circumscribing a longitudinal axis of rotation for the housing; an angulated partition having substantially flat perforate and imperforate portions interconnected in obtuse angular relation and respectively connected to the side wall in circumferentially spaced relation therearound so as to divide the housing into sifting and bathing compartments, the imperforate portion being extended substantially radially inwardly from the side wall, the side wall having an animal passageway in juxtaposition to said imperforate portion and leading into the bathing compartment; means rotatably supporting the housing in a substantially axially horizontal attitude; and means connected to the housing for oscillating the same in opposite directions through a predetermined angle thereby to move said perforate portion through an intermediate upright position downwardly extended from said imperforate portion between oppositely downwardly declined bathing and discharging positions with said imperforate portion being respectively extended upwardly and downwardly toward said passageway from said perforate portion in said positions whereby such dust is adapted to be sifted by passage into the sifting compartment from the bathing compartment as the perforate portion moves toward discharging position, and whereby foreign particles sifted from the material gravitate downwardly along the partition and through the passageway in said discharging position.

4. In an animal bathing apparatus, an elongated, substantially cylindrical housing having opposite ends interconnected by an annular side wall circumscribing a longitudinal axis of rotation for the housing; flowable bathing dust in the housing; a partition within the housing including perforate and imperforate portions respectively inwardly chordally extended from the side wall in circumferentially spaced relation therearound and being angularly interconnected along a line substantially parallel to said axis, the partition dividing the housing into sifting and bathing compartments on opposite sides thereof and the side wall having a substantially rectangular animal passageway leading into the bathing compartment adjacent to said imperforate portion of the partition; a door mounted on the side wall for movement between a closed position over the passageway and an open position outwardly spaced from the passageway; means rotatably supporting the housing in substantially axially horizontal position for oscillating movement between bathing and non-bathing positions with the passageway disposed respectively upwardly and downwardly in said positions, said perforate portion of the partition moving through an arc beneath said axis between oppositely downwardly declined positions; and means connected to the door for moving the door between said open and closed positions when the housing is respectively in bathing and non-bathing positions.

5. The apparatus of claim 4 wherein said perforate portion of the partition includes a plurality of elongated, transversely spaced bars interconnecting the imperforate portion and the side wall and chordally extended longitudinally transversely of the axis of the housing whereby foreign particles in said bathing dust are precluded by the spacing between the bars from passing from the bathing compartment into the sifting compartment and whereby such foreign particles slide longitudinally along the bars onto the imperforate portion and thence out of the housing through said passageway as the housing moves from bathing position into its non-bathing position.

6. The apparatus of claim 4 wherein the door is pivotally mounted on the side wall for movement about an axis extended substantially parallel to the axis of rotation of the housing, including a lever connected to the door and extended outwardly from said pivot axis of the door in a direction opposite to that of the door, and a weighted member connected to the lever in spaced relation to said pivotal axis for urging the door into open or closed positions depending on whether the housing is moving into bathing or non-bathing position.

7. A dust bathing apparatus comprising a substantially cylindrical housing including a pair of spaced parallel end walls interconnected by a substantially cylindrical side wall concentrically circumscribing an axis of rotation for the housing and having an elongated, rectangular passageway, said passageway being circumscribed by the end walls and by first and second, spaced, parallel edges of the side wall extended longitudinally thereof; an imperforate panel integrally inwardly extended from said first edge into the housing chordally of the side wall; an elongated bracket connected internally to and extended longitudinally of the side wall in circumferentially spaced relation to said first edge and between said first edge and the line of intersection of the plane of the partition and the side wall diametrically opposite to said first edge; a plurality of elongated bars longitudinally extended chordally of the side wall in substantially uniformly, transversely spaced, relation between the panel and said bracket, the bars having opposite ends respectively rigidly connected to the panel and to said bracket; finely divided, animal bathing dust in the housing; means coaxially pivotally connected to the end walls of the housing mounting the same for intermittent oscillating movement in opposite directions between a non-bathing position with the passageway directed downwardly and the dust collected between the side wall and the panel under the bars and a bathing position with the passageway directed upwardly and the dust collected in the housing under the panel and the bars substantially opposite to the passageway, said dust sifting between the bars as the housing oscillates between said positions; a rectangular door having a hinging edge pivotally connected to said first edge for pivotal movement about an axis parallel to the axis of rotation of the housing, an opposite abutment edge, and side edges extended between the hinging and abutment edges; a lever rigidly connected to the door and outwardly extended from the pivot axis of the door in the opposite direction from the door; a weight connected to the arm heavier than the door for pivoting the door between a closed position covering the passageway in the non-bathing position of the housing and an open position spaced outwardly away from the passageway when the housing is in bathing position, the abutment edge of the door engaging the side wall adjacent to said first edge and said side edges engaging said end walls in the closed position of the door thereby limiting movement of the door through the passageway into the housing and completely closing the passageway; and powered means connected to the housing for oscillating the same between said bathing and non-bathing positions, said bars precluding passage of large particles therebetween when the dust sifts therethrough whereby such particles slide downwardly along the bars and the panel and out of the passageway before the door pivots into closed position and when the bars and panel are downwardly declined as the housing moves from bathing position to non-bathing position.

8. In an animal bathing apparatus, a housing including a side wall circumscribing an axis of rotation for the housing and a bathing compartment therein and including an elongated passageway large enough to allow an animal to enter or leave the compartment through the passageway; means mounting the housing for rotatable movement on said axis between a bathing position with the passageway spaced above said axis and a circumferentially spaced non-bathing position with said passageway spaced below the axis; resilient means mounted in laterally spaced relation to and on one side of the axis of the housing and connected to the housing eccentrically of said axis for urging the housing into said bathing position; and powered means mounted in laterally spaced relation to and on the side of the axis opposite from said resilient means and connected to the housing for rotating the housing against the urgence of said resilient means into said non-bathing position, and for intermittently releasing said housing to permit said resilient means to move the housing into said bathing position and thereafter returning said housing into said non-bathing position.

9. The apparatus of claim 8 wherein the housing has a pair of spaced parallel end walls connected to the side wall; wherein a stud is endwardly extended from one of the end walls in offset relation to the axis of the housing; wherein said resilient means includes a tension spring and a first tension member extended above the axis of the housing and connected to said stud; and wherein said powered means includes a second tension member connected to said stud and an arm mounted for rotation about an axis substantially parallel to the axis of the housing and in a substantially common plane with the stud in both of said non-bathing and bathing positions, the second tension member being connected to the arm in radially outwardly spaced relation to its axis of rotation, and means for rotating the arm about its axis between an extended position projected away from the housing wherein the housing is urged into non-bathing position and a releasing position extended toward the housing wherein said housing can be urged into bathing position by the spring.

References Cited in the file of this patent

UNITED STATES PATENTS

| | | |
|---|---|---|
| 2,653,569 | Forester | Sept. 29, 1953 |
| 2,661,800 | Reichenbach | Dec. 8, 1953 |
| 2,713,321 | Keen | July 19, 1955 |
| 2,960,965 | Cordis | Nov. 22, 1960 |